(12) United States Patent
Yoshimura et al.

(10) Patent No.: US 7,414,772 B2
(45) Date of Patent: Aug. 19, 2008

(54) COLOR-NEUTRAL REFLECTIVE CONTROL SWITCHABLE THIN FILM MATERIAL

(75) Inventors: Kazuki Yoshimura, Aichi (JP); Shanhu Bao, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 11/774,828

(22) Filed: Jul. 9, 2007

(65) Prior Publication Data

US 2008/0013160 A1 Jan. 17, 2008

(30) Foreign Application Priority Data

Jul. 12, 2006 (JP) .............................. 2006-191189

(51) Int. Cl.
*G02F 1/153* (2006.01)

(52) U.S. Cl. .................... 359/275; 359/265; 359/321; 359/601; 359/602; 359/603; 359/604; 359/608; 359/884

(58) Field of Classification Search ................. 359/265, 359/275, 321, 601–604, 608, 884
See application file for complete search history.

(56) References Cited

U.S. PATENT DOCUMENTS

| 5,032,470 | A | * | 7/1991 | Shindo et al. | ................ | 428/823 |
| 5,041,341 | A | * | 8/1991 | Shindo et al. | ................ | 428/626 |
| 5,111,328 | A | * | 5/1992 | Demiryont | ................... | 359/265 |
| 5,280,381 | A | * | 1/1994 | Mason | ........................ | 359/268 |
| 5,314,757 | A | * | 5/1994 | Shindo et al. | ................ | 428/627 |
| 6,762,871 | B2 | | 7/2004 | Yoshimura | | |
| 2005/0129566 | A1 | * | 6/2005 | Fetcenko et al. | ............ | 420/441 |
| 2006/0266441 | A1 | * | 11/2006 | Fetcenko et al. | ............ | 148/403 |

FOREIGN PATENT DOCUMENTS

| JP | 2003-335553 | 11/2003 |
| JP | 2004-139134 | 5/2004 |
| JP | 2005-56706 | 3/2005 |
| JP | 2005-274630 | 10/2005 |

OTHER PUBLICATIONS

J.N. Huiberts, et al., "Yttrium and Lanthanum Hydride Films with Switchable Optical Properties," Nature, vol. 380, Mar. 21, 1996, pp. 231-234.
S. Bao, et al., "Color-Neutral Switchable Mirrors Based on Magnesium-Titanium Thin Films," Applied Physics A 87 Materials Science & Processing, 2007, pp. 621-624.

* cited by examiner

*Primary Examiner*—Evelyn A. Lester
(74) *Attorney, Agent, or Firm*—Oblon, Spivak, McClelland, Maier & Neustadt, P.C.

(57) ABSTRACT

The present invention provides a reflective control switchable thin film material that can become completely colorless when transparent, and the present invention relates to a reflective control switchable thin film material composed of a multi-layer thin film in which a magnesium-titanium alloy thin film is used, and to reflective light control glass, and light control window glass, wherein a magnesium-titanium alloy thin film is used as a control switchable layer, a catalyst layer is formed on the surface of the thin film, a protective layer is optionally formed over the catalyst layer, the material has chromic characteristics whereby a colorless and transparent state is produced by hydrogenation at room temperature (about 20° C.), and the material has chromic characteristics whereby a mirror state is produced by dehydrogenation at room temperature (about 20° C.), and thereby a novel magnesium-titanium alloy thin film material that exhibits excellent reflective control switchable characteristics and is colorless when transparent is provided.

12 Claims, 12 Drawing Sheets

(a)

(b)

MIRROR STATE     TRANSPARENT STATE

MIRROR STATE  TRANSPARENT STATE

COLOR-NEUTRAL REFLECTIVE CONTROL SWITCHABLE THIN FILM MATERIAL

BACKGROUND OF THE INVENTION

1. Field of the Invention

The present invention relates to a reflective control switchable thin film material and reflective control switchable (light control) glass in which a magnesium-titanium alloy thin film is used, and more particularly relates to a novel magnesium-titanium alloy-based reflective light control material used in light control glass that automatically controls the amount of sunlight coming through window glass, without using blinds or curtains, and to reflective light control glass produced using this material. The present invention provides window material technology pertaining to a novel reflective control switchable thin film material for controlling the transmissivity of sunlight through the windows of buildings or vehicles.

2. Description of the Related Art

Windows (openings) are generally the place where the most heat comes into and goes out of buildings. For example, about 48% of the heat produced by heating systems in winter escapes through windows, and the proportion of heat that comes in through the windows of air-conditioned rooms in summer can reach about 71%. Therefore, a tremendous energy savings can be realized by effectively controlling light and heat at windows. Light control glass was developed for this purpose, and its function is to control the inflow and outflow of light and heat.

There are several ways by which light is controlled with this light control glass. Of these, 1) a material that reversibly changes its transmissivity under application of current or voltage is called an electrochromic material, 2) a material whose transmissivity changes with temperature is called a thermochromic material, and 3) a material whose transmissivity is changed by controlling the atmosphere gas is called a gas chromic material. Of these, the most research has gone into electrochromic light control glass in which a tungsten oxide thin film is used for the light control layer, and this glass has just about reached the practical stage today, and some commercial products have already appeared.

Electrochromic light control glass that has been known up to now, including tungsten oxide, is all based on the principle that light is controlled by absorbing light with a light control layer. A drawback to this type of light control glass is that heat is produced when the light control layer absorbs light, and this heat is radiated back into the room, which diminishes the energy saving effect. To eliminate this drawback, the light control must be performed by reflecting light, rather than by absorbing it. Accordingly, there has been a need for the development of a light control material having characteristics that allow it to reversibly switch between a mirror state and a transparent state.

Such a material capable of switching between a mirror state and a transparent state could not be found for a long time, but in 1996 a group in the Netherlands discovered a hydride of a rare earth such as yttrium or lanthanum switches between a mirror state and a transparent state under the influence of hydrogen, and such a material has been termed a "switchable mirror" (J. N. Huiberts, R. Griessen, J. H. Rector, R. J. Wijngaarden, J. P. Dekker, D. G. de Groot, N. J. Koeman, Nature, 380 (1996), 231). These rare earth hydrides undergo a large change in transmissivity, and have excellent light control mirror characteristics. Nevertheless, because a rare earth element is used in the material, there are problems in terms of resources and cost when these switchable mirrors are used for window coatings and so forth.

Materials known up to now to have reflective light control characteristics (switchable mirror characteristics) include hydrides of yttrium, lanthanum, and other rare earth metals, hydrides of allows of magnesium and a rare earth metal such as gadolinium, and hydrides of magnesium-nickel alloys. Of these, the ones most suited to coating window glass from the standpoint of resources and cost are those that make use of a magnesium-titanium alloy (Japanese Laid-Open Patent Application 2003-335553; Japanese Laid-Open Patent Application 2004-139134; Japanese Laid-Open Patent Application 2005-056706; Japanese Laid-Open Patent Application 2005-274630). However, light control layers made from materials reported up to now, while varying in degree, do not become colorless when transparent, and instead have a tint, which poses a major problem when applied to window glass.

SUMMARY OF THE INVENTION

In light of the above situation and prior art, the inventors conducted diligent research aimed at developing a novel light control material that would become colorless when transparent, and as a result arrived at the present invention upon forming a thin film of a magnesium-titanium alloy, evaluating the switchable mirror characteristics of this film, and succeeding at developing a control switchable thin film that becomes completely colorless and transparent during hydrogenation.

It is an object of the present invention to provide a novel magnesium-titanium alloy-based reflective control switchable material that makes use of a lost-cost magnesium-titanium alloy thin film and an extremely small amount of palladium film or other such catalyst layer. It is another object of the present invention to provide a structure of a reflective light control glass window that makes use of this switchable mirror material. It is a further object of the present invention to provide a novel reflective control switchable thin film material that should yield considerable cost reductions because the coating layer is a simple two-layer configuration, and applications of this material.

To solve the above problems, the present invention is constituted by the following technological means.

(1) A reflective control switchable thin film material composed of a multilayer thin film in which a magnesium-titanium alloy thin film is used, comprising 1) a magnesium-titanium alloy thin film used as a control switchable layer, (2) a catalyst layer formed on the surface of said thin film, (3) a protective layer optionally formed over said catalyst layer, the material 4) has chromic characteristics whereby a colorless and transparent state is produced by hydrogenation at room temperature (about 20° C.), and 5) has chromic characteristics whereby a mirror state is produced by dehydrogenation at room temperature (about 20° C.).

(2) The material according to (1) above, wherein the magnesium-titanium alloy thin film has a composition of $MgTi_x$ ($0.1 < x < 0.4$), and contains crystallized magnesium.

(3) The material according to (1) above, wherein the thickness of the magnesium-titanium alloy thin film is 10 to 200 nm.

(4) The material according to (1) above, wherein the control switchable layer becomes colorless during hydrogenation, and chromaticity coordinates calculated from the transmission spectrum of said layer are within a distance of 0.02 from the point $x=0.333$ and $y=0.333$.

(5) The material according to (1) above, wherein the surface of the thin film is coated with 1 to 10 nm of palladium or palladium alloy as a catalyst layer.

(6) The material according to (1) above, wherein the protective layer is composed of a material that is transmissive to hydrogen and non-transmissive to water.
(7) A reflective control switchable member, comprising a light control component composed of the reflective control switchable thin film material using a magnesium-titanium alloy thin film defined in any one of (1) to (6) above, formed on the surface of a transparent member.
(8) The reflective control switchable member according to (7) above, wherein the light control component is formed on a glass surface.
(9) A gas chromic reflective light control glass window composed of multi-ply glass, comprising the reflective control switchable member according to (8) above used on one side of the multi-ply glass.
(10) The gas chromic reflective light control glass window according to (9) above, wherein an atmosphere controller that introduces hydrogen gas, air, or oxygen gas is provided in a gap of the multi-ply glass.
(11) An electrochromic reflective control switchable material, comprising a structure in which electrolyte is sandwiched between a transparent electrode and the reflective control switchable thin film material using a magnesium-titanium alloy thin film defined in any one of (1) to (6) above.
(12) An electrochromic reflective light control glass window, comprising the electrochromic reflective control switchable material defined in (11) above applied to a glass window.

The present invention will now be described in further detail.

The present invention is a reflective control switchable thin film material, characterized in that a magnesium-titanium alloy thin film is used as a light control layer, that a catalyst layer is formed on the surface of the thin film, that a protective layer is optionally formed over the catalyst layer, that the material has chromic characteristics whereby a colorless and transparent state is produced by hydrogenation at room temperature (about 20° C.), and that the material has chromic characteristics whereby a mirror state is produced by dehydrogenation at room temperature (about 20° C.).

The present invention is also a reflective control switchable member, characterized in that a light control component, composed of a reflective control switchable thin film material in which the above-mentioned magnesium-titanium alloy thin film is used, is formed on the surface of a transparent member. Moreover, the present invention is characterized in that the reflective control switchable member is used on one side of the multi-ply glass. The present invention is also an electrochromic reflective control switchable material, characterized by having a structure in which electrolyte is sandwiched between a transparent electrode and a reflective control switchable thin film material that makes use of the above-mentioned magnesium-titanium alloy thin film. The present invention is also an electrochromic reflective light control glass window, wherein the above-mentioned electrochromic reflective control switchable material is applied to a glass window.

In a preferred embodiment of the reflective control switchable thin film of the present invention, the magnesium-titanium alloy thin film has a composition of $MgTi_x$ ($0.1<x<0.4$), and contains crystallized magnesium, and is composed of an extremely thin magnesium-titanium alloy thin film with a thickness of about 10 to 200 nm. This magnesium-titanium alloy thin film with excellent control switchable characteristics can be produced, for example, by sputtering, vacuum vapor deposition, electron beam vapor deposition, chemical vapor deposition (CVD), plating, or another such method. However, the method of film formation is not limited to the above methods.

With the present invention, a catalyst layer is formed on the surface of the magnesium-titanium alloy thin film. Palladium or a palladium alloy can be used favorably as this catalyst layer. It is not limited to these, however, and any material with the same effect as these can be used. The catalyst layer can be produced, for example, by sputtering, vacuum vapor deposition, electron beam vapor deposition, chemical vapor deposition (CVD), plating, or another such method. However, the method is not limited to the above.

A switchable mirror member or switchable mirror glass is obtained by forming a light control layer composed of the above-mentioned switchable mirror material on a transparent member of a substrate or a glass surface. Favorable example of the substrate here include acrylic, plastic, transparent sheeting, and glass. This list is not comprehensive, however, and any material that has the same effect as these can be used.

A protective layer is optionally formed over the surface of the catalyst layer with the present invention. The material of this protective layer is one that is transmissive to hydrogen and non-transmissive to water. Specific, preferable examples of the material of the protective layer include polyvinyl acetate, polyvinyl chloride, polystyrene, cellulose acetate, and other such polymers, and a titanium oxide thin film, niobium oxide thin film, and other such inorganic thin films. The material is not limited to these, however, and any material that has the same effect as these can be used. This protective layer improves the durability of the light control layer.

There are two kinds of method for hydrogenating the control switchable layer, one of which, a method for hydrogenating by exposing to a gas containing hydrogen, is called a gas chromic method, and the other, a method for hydrogenating by electrically injecting protons contained in an electrolyte, is called an electrochromic method. These two kinds of method can be used to perform switching with this magnesium-titanium alloy thin film.

For example, when switching is performed by gas, the vapor deposited magnesium-titanium alloy thin film is metal, and in its vapor-deposited state is in a silver-colored mirror state, but when this thin film is placed in an atmosphere containing hydrogen, it changes into a hydride and becomes transparent. When this hydrogenated thin film is exposed to oxygen or air, dehydrogenation occurs and the material returns to a metal state. These changes can be repeatedly effected by utilizing the above-mentioned switching.

When a sample obtained by vapor depositing a thin layer of palladium over a magnesium-titanium alloy thin film is exposed to an atmosphere containing hydrogen, hydrogenation occurs and the material enters a transparent state, and while transparent, this magnesium-titanium thin film is completely colorless. With magnesium-nickel alloy thin films and other conventional reflective control switchable thin films, the film had a yellowish tint when transparent, and this posed an obstacle when applications to window glass and the like were considered.

Physically, the color of a thin film can be evaluated by measuring the chromaticity coordinates. The farther these chromaticity coordinates are from the point $x=0.333$ and $y=0.333$, at which the color is neutral (colorless), the greater is the degree of coloration. With a magnesium-nickel alloy thin film, even with a film having a composition of $Mg_6Ni$, which has a relatively faint color, these chromaticity coordinates are about 0.5 away from the point $x=0.333$ and $y=0.333$.

In contrast, with a magnesium-titanium alloy thin film, the transparent chromaticity coordinates are not very far away from the point x=0.333 and y=0.333, and there is almost no noticeable tint. Thus, being completely colorless when the thin film is transparent is the most salient characteristic of a magnesium-titanium alloy thin film.

As shown by the working examples given below, the control switchable characteristics of the reflective light control window glass of the present invention depend on the composition of magnesium and titanium in the magnesium-titanium alloy thin film. Excellent control switchable characteristics are exhibited when the value of x in $MgTi_x$, that is, the compositional ratio of titanium to magnesium, is between 0.1 and 0.4. As a general tendency, the greater is the titanium content, the faster is dehydrogenation, but the transmissivity when transparent is lower, so the composition is preferably selected as dictated by the intended application.

In general, a reflective control switchable thin film material undergoes degradation during repeated switching, until switching gradually becomes impossible. For example, in the case of magnesium-nickel alloy thin films that have been developed so far, after switching has been repeated about 150 times, the material is substantially unable to change anymore. The switching characteristics of a magnesium-titanium alloy thin film were examined, which revealed that such a film has better durability than a magnesium-nickel alloy thin film. The reason for this is believed to be the differences in the crystal structure and the surface structure of the thin films.

The structure of a magnesium-titanium alloy thin film was analyzed, which showed it to be composed of crystallized magnesium, with titanium dispersed therein. Other reflective control switchable thin film materials, such as a magnesium-nickel alloy thin film, do not have crystallized magnesium, and having crystallized magnesium is a major characteristic of a magnesium-titanium thin film.

Also, the sample surface was observed, which revealed it to have a distinctive textured structure. With a magnesium-nickel alloy thin film, observation by electron microscope shows the surface to be extremely flat, and no such textured structure is seen at all. Therefore, the fact that a structure such as this is seen is another major characteristic of a magnesium-titanium alloy thin film, and is believed to be related to the fact that the magnesium is crystallized.

In the case of a magnesium-nickel alloy thin film or the like, because the surface is flat, it is susceptible to the effects of expansion and contraction caused by hydrogenation, and this is considered to be a major cause of degradation. In contrast, because a magnesium-titanium alloy thin film has a distinctive surface structure, the effects of expansion and contraction are moderated, and this seems to be linked to higher durability.

FIG. 1 shows the structure of a light control glass window that performs light control by the gas chromic method. When the control switchable material of the present invention is used as actual gas chromic light control glass, a magnesium-titanium alloy thin film coated with a thin catalyst layer of palladium or the like is disposed on the inside of the two-ply glass constituting window glass, the layers are sealed, and the gap in between is filled with argon gas, for example.

A unit (atmosphere controller) for electrolyzing water to generate and feed hydrogen, or for feeding either air or oxygen obtained by the hydrolysis of water is attached in the space within this gap. Hydrogen is supplied from this atmosphere controller into the space between the two sheets of glass, producing a transparent state, or oxygen is supplied to produce a metal state. The specific structure of the atmosphere controller can be designed as desired.

The use of multi-ply glass (two-ply glass) in homes has become more popular, to the point that using two-ply glass is now standard procedure in new home construction. Coatings for switchable mirror glass such as the switchable mirror material of the present invention can be applied to the inside of two-ply glass, allowing the space on the inside of the glass to be utilized for introducing hydrogen gas for switching, and as such is extremely advantageous.

FIG. 2 illustrates an example of the structure of a device used to perform light control electrochromically, which another switching method. FIG. 2A shows a structure in which a magnesium-titanium alloy thin film and palladium are vapor deposited onto a substrate that has already been vapor deposited with a transparent, electroconductive film, and an alkaline electrolyte is sealed between this and another sheet of glass that has been vapor deposited with a transparent, electroconductive film. When a voltage of about −3V is applied to the magnesium-titanium alloy thin film side, the protons in the electrolyte enter the magnesium-titanium alloy thin film, hydrogenate it, and render it transparent. When a voltage of about +1V is applied, the protons in the hydride escape and the material returns to a metal state, resulting in a mirror state.

With an electrochromic device in which a magnesium-titanium alloy thin film is used, as shown in FIG. 2B, it is also possible to use the product of vapor depositing a magnesium-titanium alloy thin film on a glass substrate without a transparent, electroconductive film. Naturally, when in a metal state, a magnesium-titanium alloy thin film has high electroconductivity and can serve as an electrode, and furthermore has conduction characteristics even after being rendered transparent, and switching can therefore be performed even without a transparent, electroconductive film.

This is a considerable advantage since it is linked to being able to produce a device with a simpler structure. As to the switching responsiveness, response is faster when a transparent, electroconductive film is applied, but an advantage to a device in which a transparent, electroconductive film is not used is that transmissivity is correspondingly higher when the film is transparent.

Thus, the present invention makes it possible to provide a magnesium-titanium alloy thin film material that is completely colorless when transparent, has excellent durability, and has excellent reflective control switchable characteristics, and reflective light control glass in which this material is used. Specifically, the product of applying a thin layer of palladium to a magnesium-titanium alloy thin film as in the present invention is different from reflective control switchable thin film materials reported in the past in that it can be made completely colorless when transparent, and is therefore considered a breakthrough to the practical use of light control glass.

Furthermore, the switchable mirror glass of the present invention can be used not only in the above-mentioned window materials, but also in all kinds of other products. This allows a switchable mirror function to be added, for example, to shielding materials aimed at protecting privacy, or to decorative items, toys, and so forth that feature the ability to switch between a mirror state and a transparent state. In the present invention, a product that has a switchable mirror function is defined as encompassing all kinds of products in which switchable mirror glass is installed.

Control switchable materials based on magnesium-nickel alloys have been developed in the past as materials suited to coating window glass, for example, but none of the thin film materials reported up to now was colorless when transparent, and instead had a brownish tint, and this posed a major problem when applied to window glass. By contrast, the magnesium-titanium alloy thin film material of the present invention becomes completely colorless when transparent, and the values of the chromaticity coordinates calculated from its transmission spectrum are within a distance of 0.02 from the point x=0.333 and y=0.333, which means that a colorless transparency can be attained that was impossible with conventional materials. The magnesium-titanium alloy thin film material of the present invention completely solves the problem of coloring when a thin film is transparent, which was one of the biggest impediments to practical use in the past, and also has good durability, and as such as great technological significance in terms of providing a novel, next-generation magnesium-titanium alloy-based reflective light control material.

The following special effects are realized with the present invention.

(1) The reflective control switchable material of the present invention can become completely colorless when transparent, and also has good durability, and is useful as a product that exhibits reflective control switchable characteristics vastly superior to those of magnesium-nickel alloys such as $Mg_2Ni$ reported in the past.

(2) The reflective control switchable glass coating of the present invention is extremely advantageous because it can be applied to the inside of two-ply glass, and the interior space can be utilized for introducing hydrogen gas for switching.

(3) A reflective control switchable material that makes use of the magnesium-titanium alloy thin film of the present invention can be produced by a simple method and means, by coating with inexpensive magnesium and titanium, as well as a very small amount of palladium or the like, and is therefore extremely advantageous in terms of cost.

(4) The reflective control switchable glass of the present invention can be used not only in the above-mentioned window materials, but also in all kinds of other products. This allows a reflective control switchable function to be added, for example, to shielding materials aimed at protecting privacy, or to decorative items, toys, and so forth that feature the ability to switch between a mirror state and a transparent state.

DESCRIPTION OF THE PREFERRED EMBODIMENTS

The present invention will now be described in specific terms by giving working examples, but the present invention is in no way limited by the following working examples.

WORKING EXAMPLE 1

A thin film based on a magnesium-titanium alloy thin film was produced using a multi-source magnetron sputtering device. Metallic magnesium, metallic titanium, and metallic palladium were each set as a target in one of three sputtering guns. A glass sheet with a thickness of 1 mm was used as the substrate, which was washed and then placed in a vacuum apparatus, and subjected to vacuum evacuation. In film formation, the magnesium and titanium were first sputtering simultaneously to produce a magnesium-titanium thin film.

The argon gas pressure during sputtering was 0.8 Pa, and direct sputtering was performed, applying a power of 30 W to the magnesium and 70 W to the titanium. After this, a power of 6 W was applied under the same vacuum conditions to vapor deposit a palladium thin film. The compositional ratio of magnesium and titanium in the thin film thus produced was analyzed by Rutherford backward scattering method and found to be Mg:Ti=35:7.35 ($MgTi_{0.21}$).

The film that was formed had a metallic gloss and was in a mirror state, but when its surface was exposed to hydrogen gas diluted to 4% with argon, hydrogenation of the thin film rendered it perfectly transparent. When this transparent film was exposed to air, dehydrogenation returned it to its original metal state (mirror state).

Figure 3:
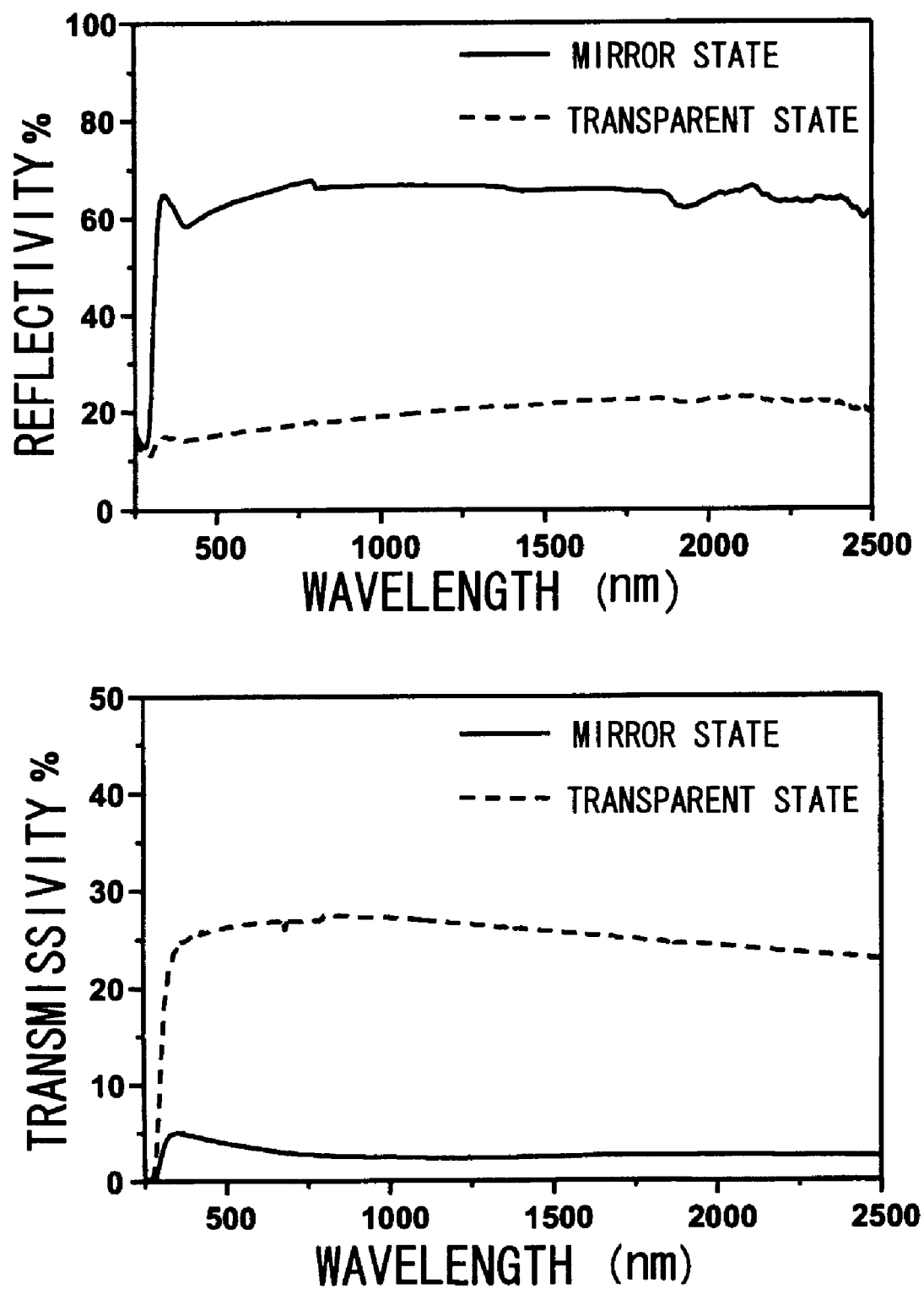
FIG. 3 shows the reflection spectrum and transmission spectrum of the mirror state and transparent state of Pd (4 nm)/$MgTi_{0.21}$ (40 nm)

FIG. 3 shows the reflection spectrum and transmission spectrum of the mirror state and transparent state of this thin film, as measured by spectrophotometer. The spectrum in the transparent state was measured by surrounding the sample with hydrogen gas diluted to 4% with argon. It can be seen that reflectivity was very different in the metal state and the transparent state, and that the film exhibits reflective chromic characteristics.

Unlike magnesium-nickel alloy thin films and other such reflective control switchable thin film materials, a control switchable thin film made from a magnesium-titanium thin film becomes completely colorless when transparent. This is also apparent in the transmission spectrum when the film is transparent, and the film has a nearly flat spectral distribution in the visible light band from a wavelength of 380 nm to 780 nm.

Figure 4:
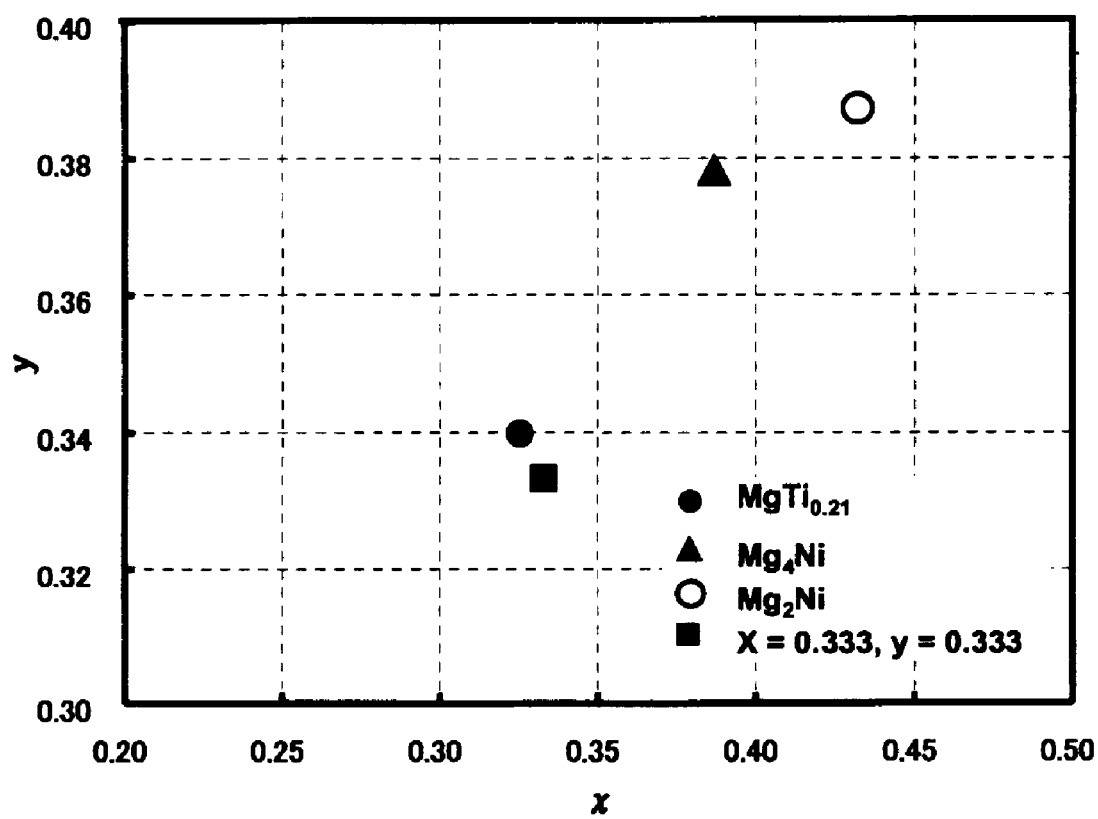
FIG. 4 shows the chromaticity coordinates of the transparent state of Pd (4 nm)/$MgTi_{0.21}$ (40 nm)

The color of a thin film can be physically expressed by chromaticity coordinates, and the closer the values are to the point x=0.333 and y=0.333, the closer the film is to being colorless. If we calculate the chromaticity coordinates of the transmitted light from the above spectrum, we find x=0.326 and y=0.340. FIG. 4 shows these calculated values expressed as chromaticity coordinates. These values were obtained by calculating on the basis of the 2-degree visual field spectrum of JIS Z 8701, which pertains to color display methods, and based on the transmission spectrum during hydrogenation of a reflective control switchable thin film in which a magnesium-titanium alloy thin film is used.

For example, in the case of the magnesium-nickel alloy $Mg_2Ni$, the above calculation yields a result of x=0.430 and y=0.385, which is far away from x=0.333 and y=0.333, and the film looks dark brown to the eye. In the case of the magnesium-nickel alloy $Mg_4Ni$, which contains more magnesium, the color is lighter, but the film still has a yellowish tint, and the chromaticity coordinates are far away from the point x=0.333 and y=0.333. If the distance from the point x=0.333 and y=0.333 is 0.02 or less, the material can be considered substantially colorless.

WORKING EXAMPLE 2

Figure 5:
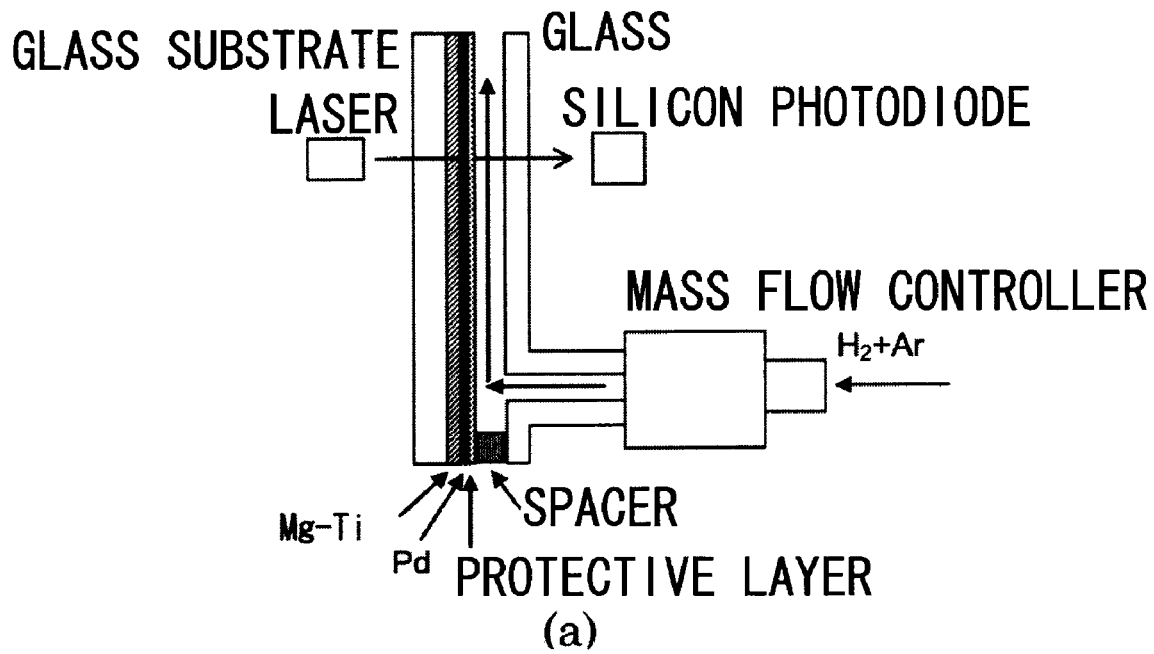
FIG. 5 is a simplified diagram of an apparatus for evaluating light control characteristics.
Figure 5:
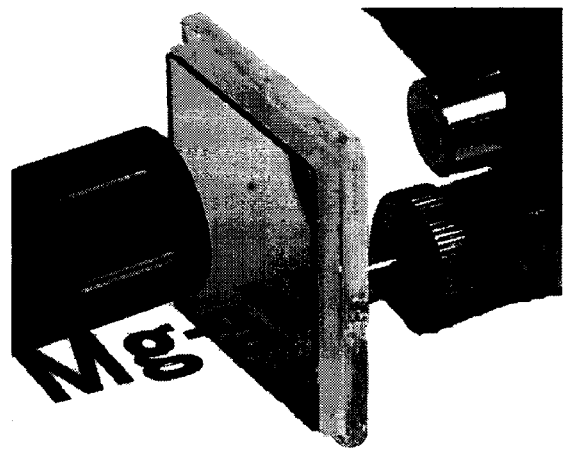

The switching characteristics of a reflective control switchable thin film based on this magnesium-titanium alloy thin film were evaluated with the apparatus for evaluating control switchable characteristics shown in FIG. 5A. A Pd/Mg—Ti thin film formed on a sheet of glass was stuck together with another sheet of glass and a silicone rubber spacer, with the thin film on the inside, and switching was performed by either allowing or not allowing hydrogen gas diluted to 4% with argon to flow into the space between the glass sheets.

When hydrogen gas flowed in, the film that was mirror-like immediately after vapor deposition changed in a few seconds to a transparent state. When the hydrogen gas was stopped, air came in through the end, and the film returned in 2 to 3 minutes to its mirror state. The change in transmissivity at a wavelength of 670 nm here was measured using a semiconductor laser and a silicon photodiode. FIG. 5B is a photograph of the measurement apparatus.

Figure 6:
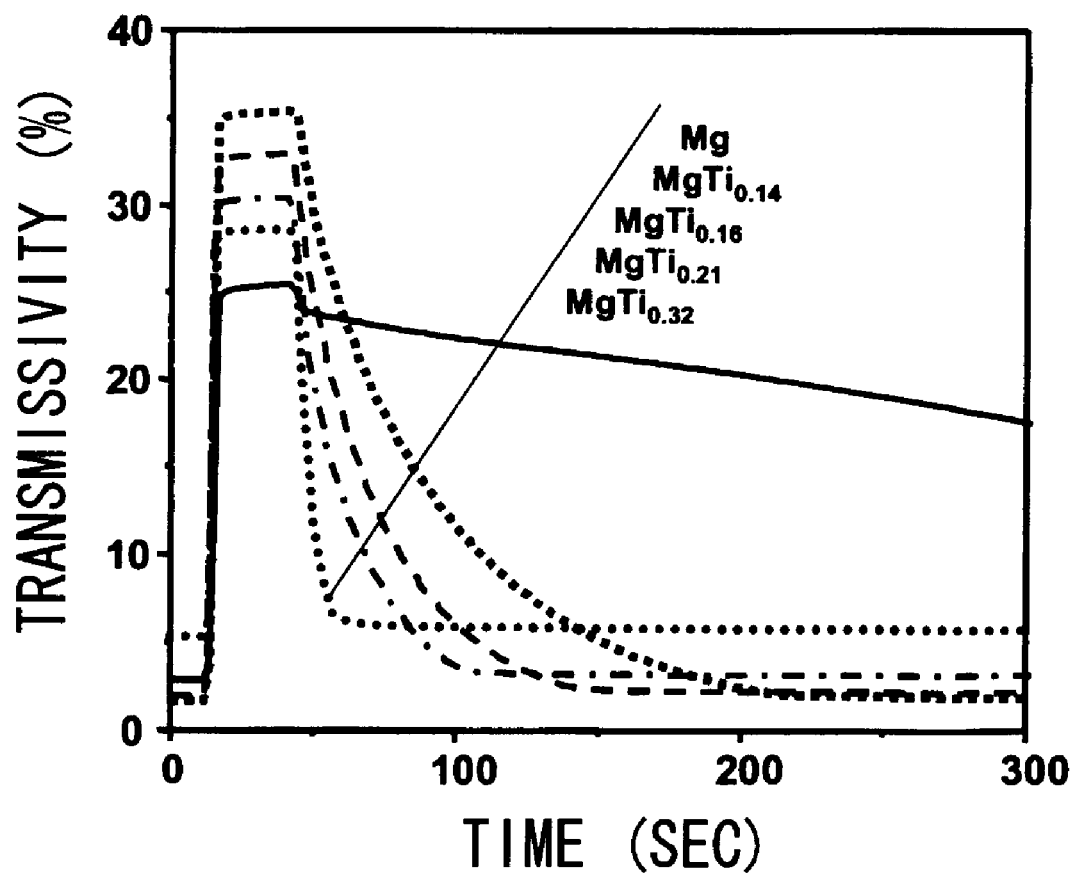
FIG. 6 is a graph of the change in optical transmissivity at a wavelength of 670 nm of $Mg_2Ni$ (1 atm of hydrogen introduced at T=5 s, 1 atm of air introduced at T=100 s)

FIG. 6 shows the results of measuring the switching characteristics of sample produced from different compositions of magnesium and titanium. During the production of the magnesium-titanium alloy thin film, the power applied to sputtering the magnesium and titanium was adjusted so as to produce samples with compositions of $MgTi_{0.14}$, $MgTi_{0.18}$, $MgTi_{0.21}$, and $MgTi_{0.32}$. For the sake of reference, a film of just magnesium, containing no titanium, was also produced.

In every case, 4 nm of palladium was vapor deposited on the outermost layer. At a time of 10 seconds, hydrogen gas diluted to 4% with argon was introduced, whereupon every sample underwent hydrogenation, changing from a metal state to a transparent state, and the transmissivity increased. The switching rate in this hydrogenation was not dependent on the composition.

Also, with every sample, when the introduction of hydrogen was halted at a time of 40 seconds, air induced dehydrogenation and the film returned to a metal state. However, the switching rate in this dehydrogenation varied considerably with the composition, and a trend was noted such that the higher titanium content was, the faster the switching. However, a trend was noted such that the higher the titanium content was, the lower the transmissivity during hydrogenation.

With a magnesium thin film containing no titanium, dehydrogenation was extremely slow, and it took about 2 hours for the film to return to its metal state. Thus, the trend noted was that with a magnesium-titanium system, the higher the titanium content, the faster the dehydrogenation, but the lower the transmissivity during hydrogenation.

WORKING EXAMPLE 3

Figure 7:
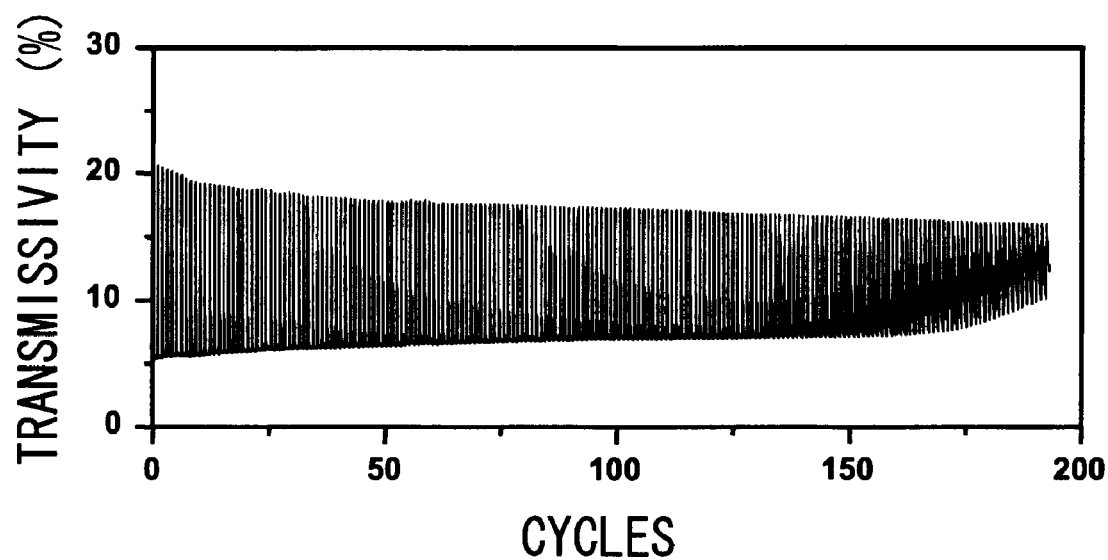
FIG. 7 is a graph of the characteristics versus repeated switching of a mirror of Pd (4 nm)/$MgTi_{0.21}$ (40 nm)

FIG. 7 is a graph of the control switchable characteristics versus repeated switching of a reflective control switchable thin film made of Pd (4 nm)/$MgTi_{0.21}$ (40 nm). With this sample, switching was repeated without much degradation up to about 160 times, and this indicates better durability than magnesium-nickel alloys and other such reflective control switchable thin films.

Figure 8:
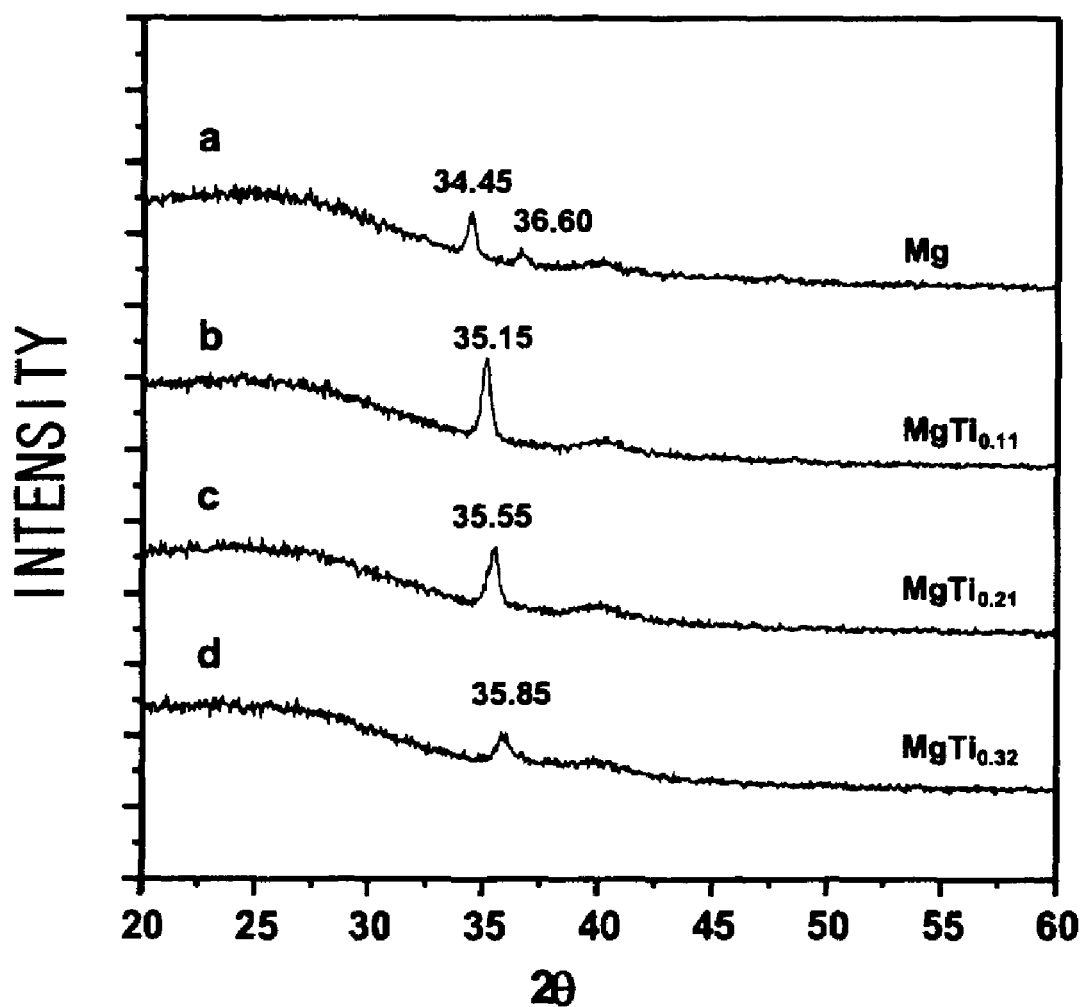
FIG. 8 is a graph of the X-ray diffraction patterns of reflective control switchable thin films in which a magnesium-titanium alloy thin film was used.

FIG. 8 is a graph of the X-ray diffraction patterns of reflective control switchable thin films in which magnesium-titanium alloy thin films of various compositions were used. The peaks in this graph are attributable to magnesium, and indicate that the sample is crystallized. With the same magnesium alloy thin film, in the case of a magnesium-nickel thin film there is no crystallization and the film is amorphous, so yielding a crystallized film is a characteristic feature of a magnesium-titanium alloy thin film.

Figure 9:
FIG. 9 shows the surface structure of a reflective control switchable thin film in which a magnesium-titanium alloy thin film was used.

FIG. 9 shows an image obtained by observation with a scanning electron microscope of the surface of a reflective control switchable thin film in which a Pd/Mg—Ti thin film was used. It can be seen that the surface of the magnesium-titanium system has a distinctive textured structure. In the case of a magnesium-nickel thin film, with a magnesium-nickel alloy thin film or the like, observation by electron microscope shows the surface to be extremely flat, and no such textured structure is seen at all. Therefore, the fact that a surface structure such as this is seen is another major characteristic of a magnesium-titanium alloy thin film, and is believed to be related to the fact that the magnesium is crystallized.

WORKING EXAMPLE 4

Figure 1:
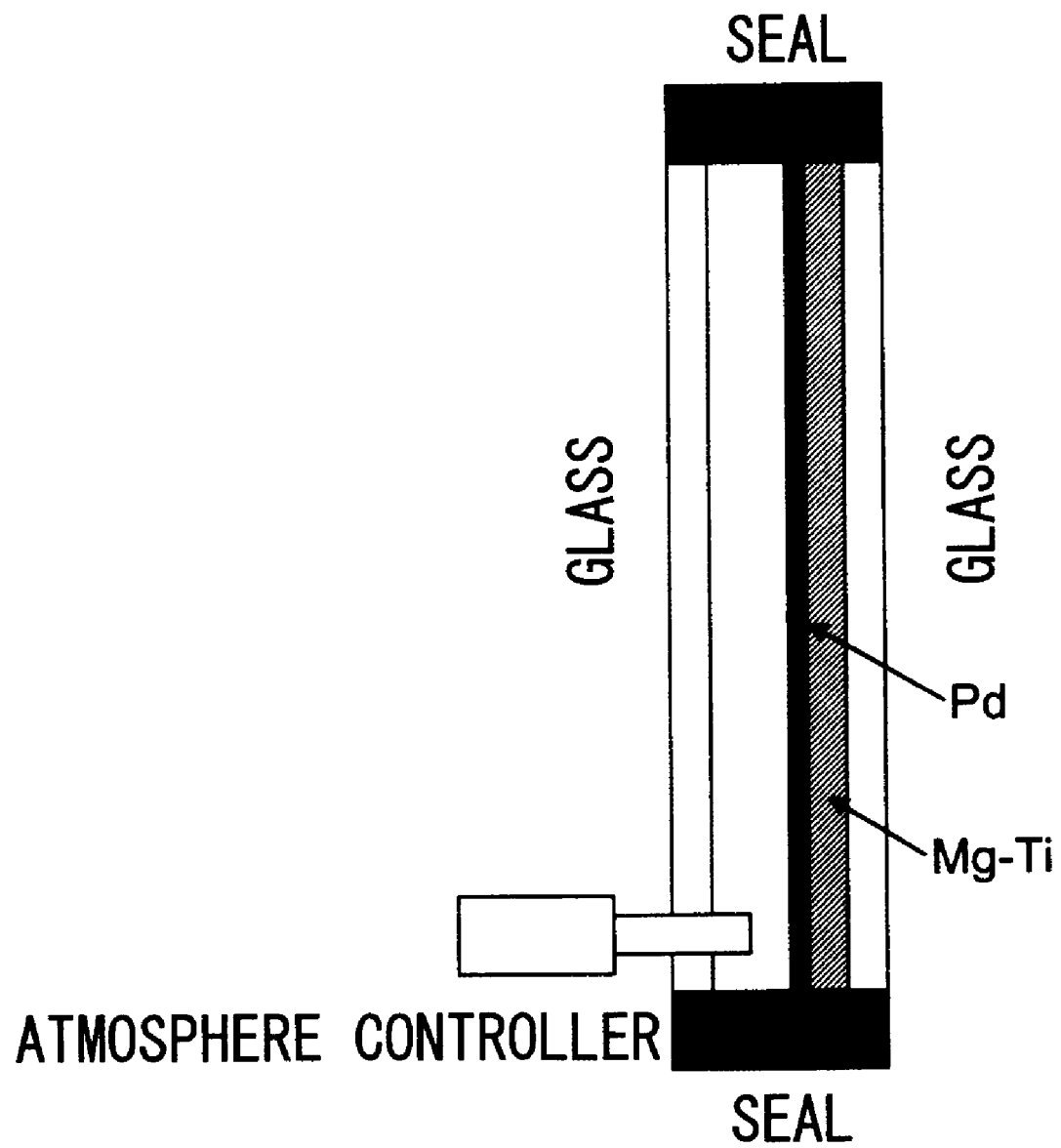
FIG. 1 shows the structure of gas-chromic reflective light control window glass.
Figure 2:
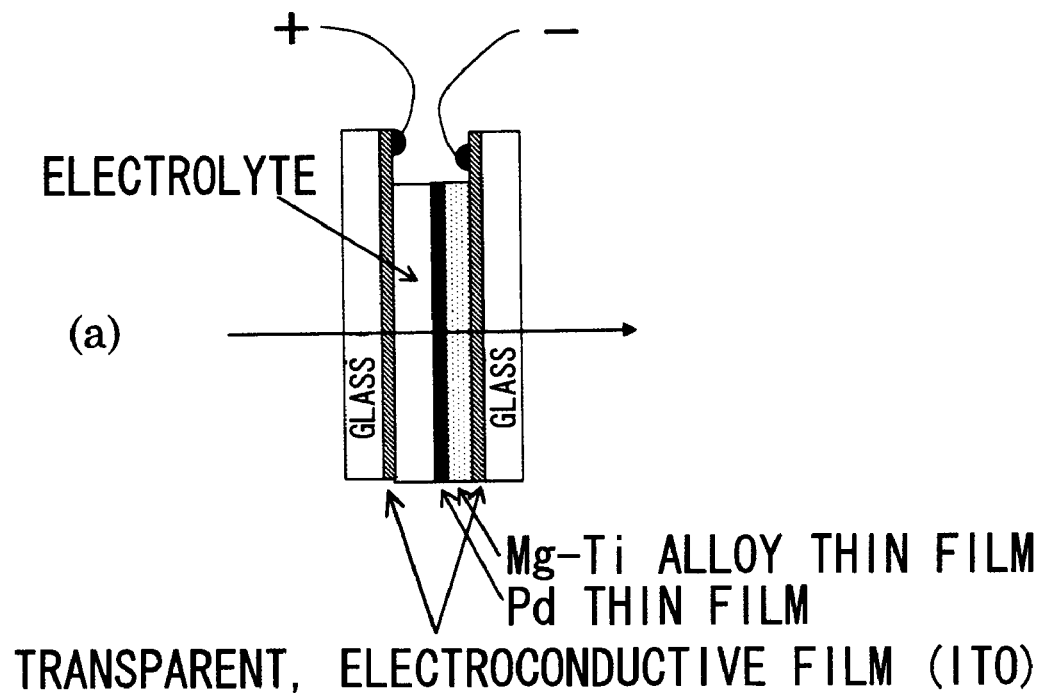
FIG. 2 shows the structure of electrochromic reflective light control glass (FIG. 2A is when a substrate with a transparent, electroconductive film is used, and FIG. 2B when a glass substrate is used)
Figure 2:
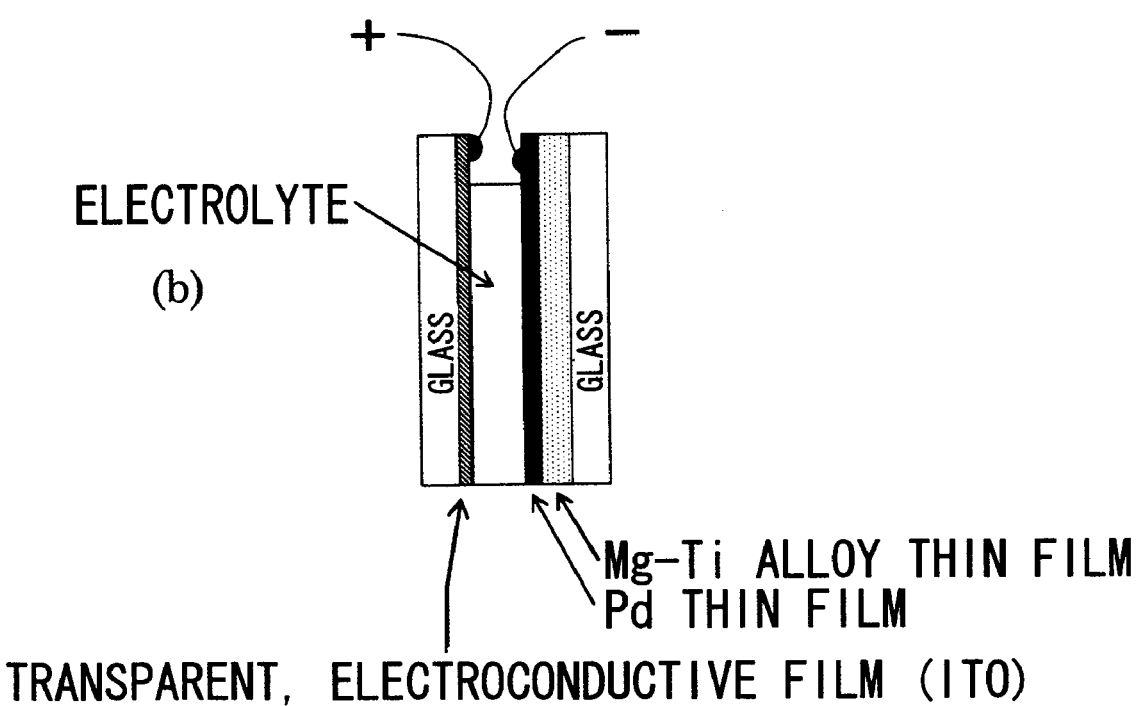

An example of electrically switching (electrochromic method) reflective control switchable glass in which a magnesium-titanium thin film is used will now be given. Devices were produced in which a control switchable thin film was based on a magnesium-titanium alloy thin film, and glass coated with ITO as a transparent, electroconductive film was used as a substrate as shown in FIG. 2A, or a sheet of glass was used as a substrate as shown in FIG. 2B.

Figure 10:
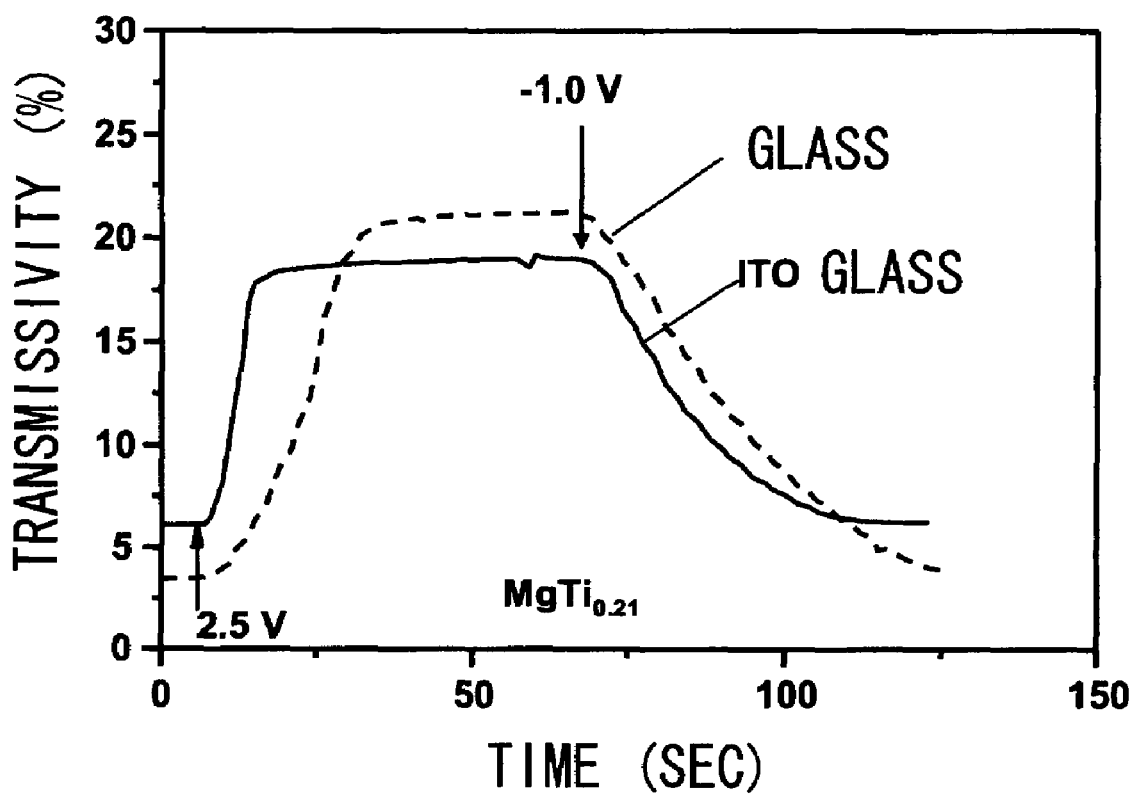
FIG. 10 is a graph of the electrochromic characteristics of two kinds of reflective light control device.
Figure 11:
FIG. 11 shows how light is controlled by a reflective control switchable electrochromic device produced on ITO.
Figure 11:
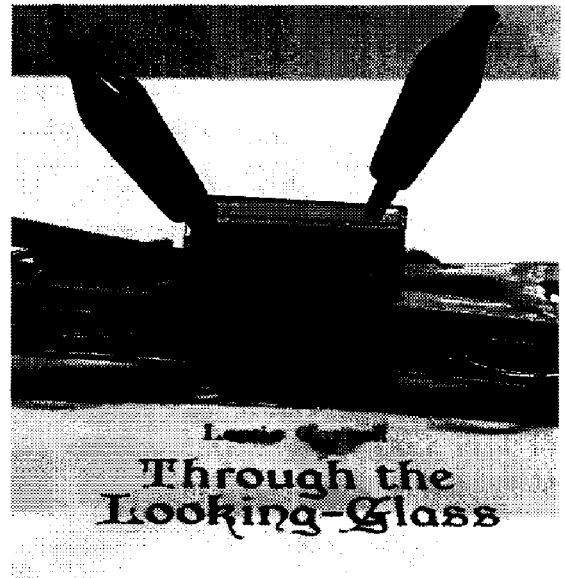
Figure 12:
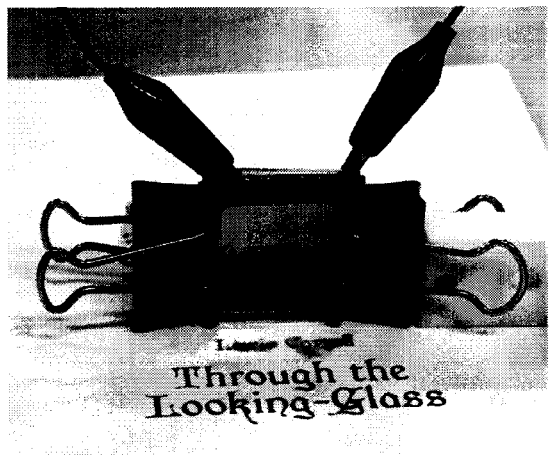
FIG. 12 shows how light is controlled by a reflective control switchable electrochromic device produced on glass.
Figure 12:
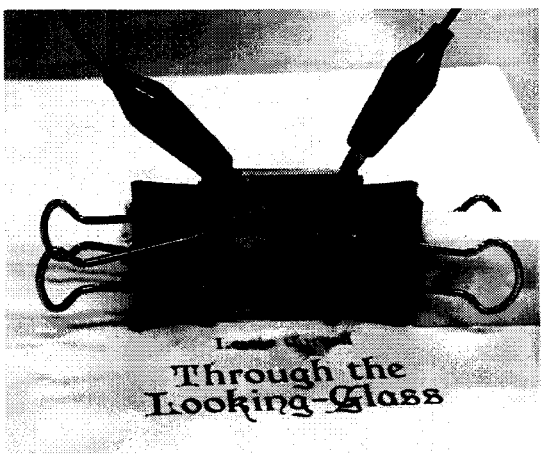

In both cases, the magnesium-titanium alloy thin film was $MgTi_{0.2}$ with a thickness of approximately 40 nm, and a palladium layer was formed over this in a thickness of approximately 6 nm. In both cases, when a voltage of −2.5V was applied to the magnesium-titanium thin film side, the film changed from a metal state to a transparent state. Conversely, when a voltage of 1.0V was applied, the film returned to its metal state. FIG. 10 shows the change in transmissivity here. FIGS. 11 and 12 shows photographs of the mirror state and transparent state of each case.

As can be seen from the switching characteristics in FIG. 10, the change from mirror to transparent is faster when an ITO substrate is used. However, the amount of change in transmissivity between the mirror state and transparent state is greater with the sample applied to a glass substrate.

As discussed in detail above, the present invention relates to a magnesium-titanium alloy thin film material with excellent reflective control switchable characteristics, and to reflective light control glass in which this material is used, and the present invention provides a reflective control switchable material that can become completely colorless when transparent, and also has good durability, and exhibits reflective control switchable characteristics vastly superior to those of magnesium-nickel alloys such as $Mg_2Ni$ reported in the past. A reflective control switchable material in which the magnesium-titanium alloy thin film of the present invention is used can be produced by a simple method and means, by coating with inexpensive magnesium and titanium, as well as a very small amount of palladium or the like, and is therefore extremely advantageous in terms of cost. The present invention can be used not only in window materials, but also in all kinds of other products, and is useful in that it provides new technology and new products related to novel magnesium-titanium alloy-based reflective control switchable glass that allows a reflective control switchable function to be added.

What is claimed is:

1. A reflective control switchable thin film material composed of a multilayer thin film in which a magnesium-titanium alloy thin film is used, comprising (1) a magnesium-titanium alloy thin film used as a control switchable layer, (2) a catalyst layer formed on the surface of said thin film, (3) a protective layer optionally formed over said catalyst layer, the material (4) has chromic characteristics whereby a colorless and transparent state is produced by hydrogenation at room temperature of about 20° C., and (5) has chromic characteristics whereby a mirror state is produced by dehydrogenation at room temperature of about 20° C.

2. The material according to claim 1, wherein the magnesium-titanium alloy thin film has a composition of $MgTi_x$, wherein 0.1x 0.4, and contains crystallized magnesium.

3. The material according to claim 1, wherein the thickness of the magnesium-titanium alloy thin film is 10 to 200 nm.

4. The material according to claim 1, wherein the control switchable layer becomes colorless during hydrogenation, and chromaticity coordinates calculated from the transmission spectrum of said layer are within a distance of 0.02 from the point x=0.333 and y=0.333.

5. The material according to claim 1, wherein the surface of the thin film is coated with 1 to 10 nm of palladium or palladium alloy as a catalyst layer.

6. The material according to claim 1, wherein the protective layer is composed of a material that is transmissive to hydrogen and non-transmissive to water.

7. A reflective control switchable member, comprising a light control component composed of the reflective control switchable thin film material using a magnesium-titanium alloy thin film defined in any one of claims 1 to 6, formed on the surface of a transparent member.

8. The reflective control switchable member according to claim 7, wherein the light control component is formed on a glass surface.

9. A gas chromic reflective light control glass window composed of multi-ply glass, comprising the reflective control switchable member according to claim 8 used on one side of the multi-ply glass.

10. The gas chromic reflective light control glass window according to claim 9, wherein an atmosphere controller that introduces hydrogen gas, air, or oxygen gas is provided in a gap of the multi-ply glass.

11. An electrochromic reflective control switchable material, comprising a structure in which electrolyte is sandwiched between a transparent electrode and the reflective control switchable thin film material using a magnesium-titanium alloy thin film defined in any one of claims 1 to 6.

12. An electrochromic reflective light control glass window, comprising the electrochromic reflective control switchable material defined in claim 11 applied to a glass window.

* * * * *